(12) United States Patent
De'Longhi

(10) Patent No.: US 8,091,470 B2
(45) Date of Patent: Jan. 10, 2012

(54) MACHINE FOR FILTERED COFFEE WITH SHUTTER OPENING

(75) Inventor: Giuseppe De'Longhi, Treviso (IT)

(73) Assignee: De'Longhi SpA, Treviso (IT)

( * ) Notice: Subject to any disclaimer, the term of this patent is extended or adjusted under 35 U.S.C. 154(b) by 733 days.

(21) Appl. No.: 12/223,097

(22) PCT Filed: Jan. 16, 2007

(86) PCT No.: PCT/EP2007/050403
§ 371 (c)(1),
(2), (4) Date: Jul. 22, 2008

(87) PCT Pub. No.: WO2007/082888
PCT Pub. Date: Jul. 26, 2007

(65) Prior Publication Data
US 2010/0229731 A1    Sep. 16, 2010

(30) Foreign Application Priority Data
Jan. 23, 2006  (IT) .............................. UD2006A0014

(51) Int. Cl.
*A47J 31/00* (2006.01)
(52) U.S. Cl. ............................... 99/307; 99/306; 99/279
(58) Field of Classification Search .................... 99/307, 99/306, 304, 302 R, 279, 289 R; 220/213, 220/252, 255, 812; 312/139.1, 138.1, 293.2, 312/295
See application file for complete search history.

(56) References Cited

U.S. PATENT DOCUMENTS

| | | |
|---|---|---|
| 242,254 A * | 5/1881 | Bird .............................. 220/252 |
| D288,885 S | 3/1987 | Kahlcke |
| 4,805,523 A | 2/1989 | Stuckey et al. |
| D310,613 S | 9/1990 | Wu |
| D316,004 S | 4/1991 | Eugster |
| D317,996 S | 7/1991 | Jack |
| D328,217 S | 7/1992 | Beeren |
| 5,239,914 A | 8/1993 | Salomon et al. |
| 5,292,023 A * | 3/1994 | Yen .............................. 220/264 |
| D345,883 S | 4/1994 | Maass |
| 5,301,600 A | 4/1994 | Medema |
| D347,961 S | 6/1994 | Beeren |
| D350,667 S | 9/1994 | Saltet |
| D359,195 S | 6/1995 | Mukai et al. |
| D359,413 S | 6/1995 | Storsberg |

(Continued)

FOREIGN PATENT DOCUMENTS

DE         103 35 824        3/2005

(Continued)

*Primary Examiner* — Reginald L Alexander
(74) *Attorney, Agent, or Firm* — Hamre, Schumann, Mueller & Larson, P.C.

(57) ABSTRACT

A machine for filtered coffee, having an upper body, inside which a filter-carrier for the coffee and a tank for the water are housed, both accessible through a window. The machine comprises a shutter able to be moved slidingly with respect to said upper body between an open condition and a closed condition of said window and vice versa, so as to selectively allow complete frontal access to said filter-carrier and to said tank, through said window, leaving free frontal access to the filter-carrier and to the water tank. The machine further comprises a pivoting opening which opens frontally with respect to a user and allows access to said tank, when said shutter is in the open condition, for conveying water to the tank without moving said tank from the machine.

7 Claims, 3 Drawing Sheets

U.S. PATENT DOCUMENTS

| | | |
|---|---|---|
| 5,586,485 A | 12/1996 | Baumann |
| 5,687,637 A | 11/1997 | Brookshire et al. |
| D418,000 S | 12/1999 | Mork et al. |
| D421,360 S | 3/2000 | Lin |
| D446,990 S | 8/2001 | Prat |
| 6,272,974 B1 | 8/2001 | Pascotti et al. |
| D449,196 S | 10/2001 | Bouhuys et al. |
| D449,197 S | 10/2001 | Byler |
| D453,656 S | 2/2002 | Byler et al. |
| 6,357,342 B1 * | 3/2002 | Leung .............. 99/279 |
| D457,376 S | 5/2002 | Lin |
| 6,532,862 B2 | 3/2003 | Mork et al. |
| D473,745 S | 4/2003 | Mulle et al. |
| D479,087 S | 9/2003 | Yao |
| D479,089 S | 9/2003 | Yao |
| D481,902 S | 11/2003 | O'Connor et al. |
| D502,628 S | 3/2005 | Ledingham et al. |
| D513,572 S | 1/2006 | Schaffeld et al. |
| D513,681 S | 1/2006 | Picozza et al. |
| D514,865 S | 2/2006 | Steiner |
| 7,013,795 B2 | 3/2006 | Mulle et al. |
| D524,588 S | 7/2006 | Copland |
| 7,146,904 B2 * | 12/2006 | Scribner ................ 99/300 |
| D543,770 S | 6/2007 | Ye |
| D543,771 S | 6/2007 | Julemont |
| D545,110 S | 6/2007 | Julemont |
| D561,515 S | 2/2008 | De Pra' |
| D561,516 S | 2/2008 | De Pra' |
| D561,517 S | 2/2008 | Borin et al. |
| D561,518 S | 2/2008 | Borin et al. |
| D562,052 S | 2/2008 | De Pra' |
| 2005/0000964 A1 * | 1/2005 | Morszeck et al. ......... 220/345.5 |
| 2006/0016346 A1 * | 1/2006 | Mulle et al. ............. 99/279 |
| 2008/0216667 A1 * | 9/2008 | Garman et al. ............ 99/304 |

FOREIGN PATENT DOCUMENTS

EP 0 079 235 5/1983

* cited by examiner

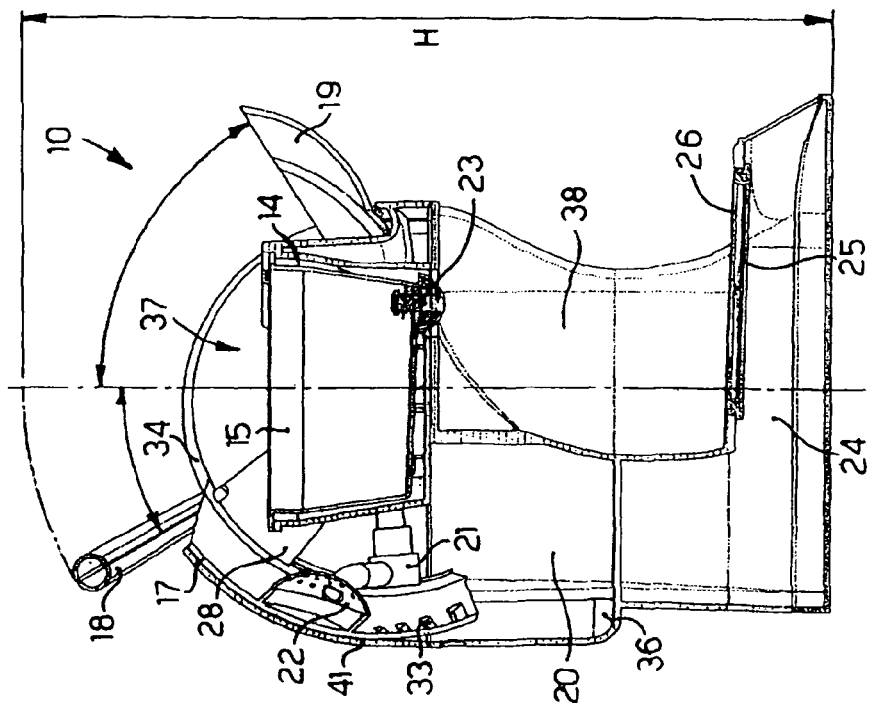
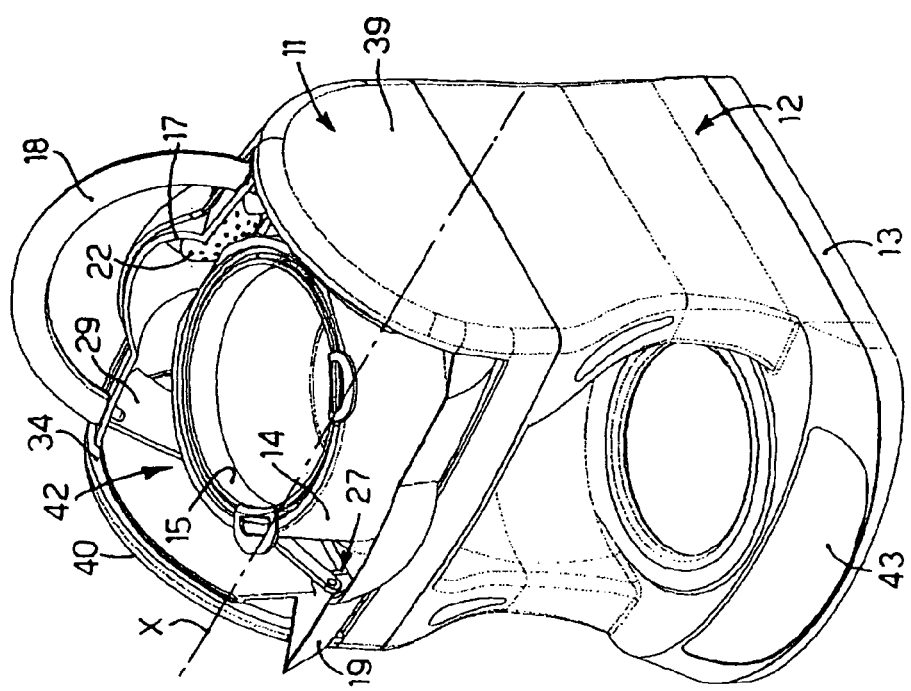

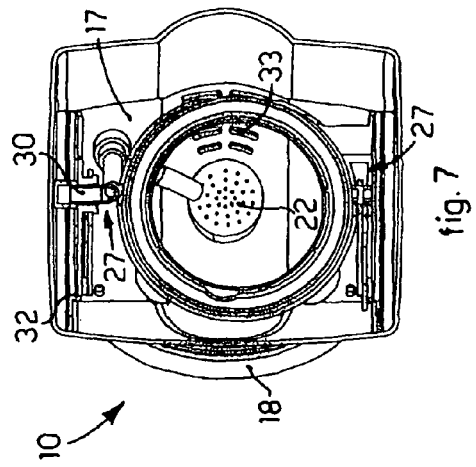
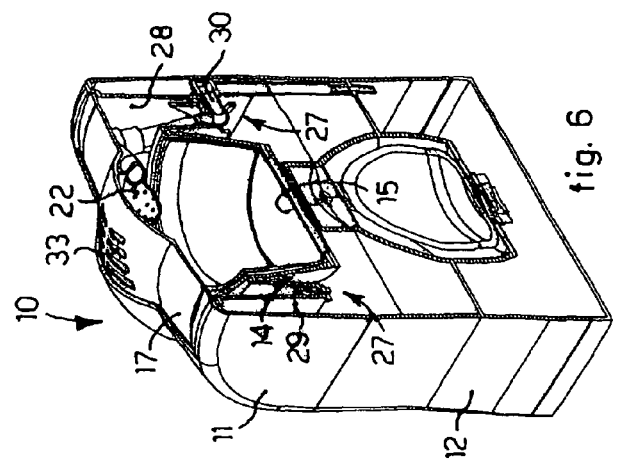
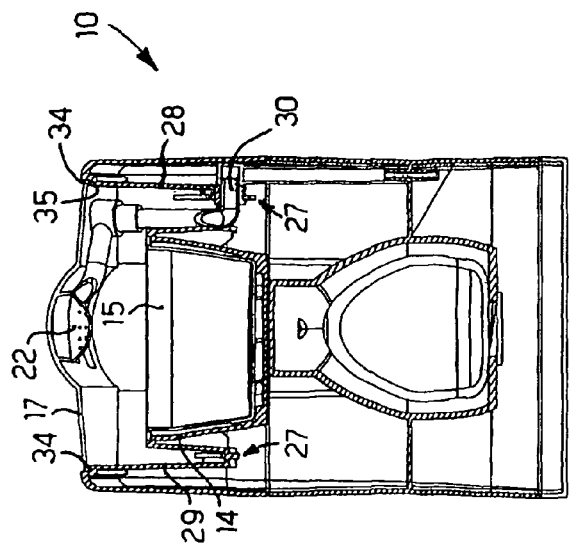

MACHINE FOR FILTERED COFFEE WITH SHUTTER OPENING

FIELD OF THE INVENTION

The present invention concerns a machine for filtered coffee, having a completely frontal system for loading the coffee and water, so as to allow direct and frontal access to the filter for the powdered coffee and to the water tank, in order to carry out the usual operations to prepare and reload the machine.

By prepare and reload we mean all those operations necessary to dispose/remove the filter in a relative filter-carrier compartment and/or load it and/or clean it, and also to fill the tank and/or maintain it, or other.

In the following description we shall refer specifically to a machine for preparing filtered coffee, but it is clear that the machine can be effectively used, as moreover is already known, for preparing tisanes, infusions or similar drinks obtained by percolating hot vegetable substances.

BACKGROUND OF THE INVENTION

Machines for preparing filtered coffee, also called "American coffee", are known.

These known machines substantially have a main body which houses a filter for the powdered coffee, disposed in a relative filter-carrier compartment, and a tank for the water. Such known machines are also provided with at least a lid pivoted to the upper part of the main body, which lid opens by rotating upwards.

The upward opening of the lid allows access only from above, both to the filter-carrier compartment to load, clean and/or replace the filter, and also to the water tank in order to carry out direct loading or removal from above, and/or other similar operations for reloading and preparing the machine.

These known machines have the disadvantage, however, that they allow the above operations to be performed only by intervening from above; for their installation they therefore need, not only the volume of the main body, but also an additional space upwards, both to lift the lid and also for the loading maneuvers by the user; they thus limit their potential use in built-in applications, for example in furniture for domestic kitchens and suchlike.

Alternatively, the user is obliged, every time the machine is reloaded, to displace the machine in order to prevent interference with adjacent furniture or equipment.

Machines for filtered coffee are also known with a main body which has, pivoted to it, both a door opening frontally with the filter-carrier compartment integrated into it, also known as a swing-basket, and also an upper lid opening upwards, to allow water to be fed to the tank.

In these known machines, in order to allow a correct positioning/removal of the filter in/from the filter-carrier compartment, a great lateral rotation of the swing basket is necessary, more than 90°, which entails a lateral increase in bulk of the machine in the open condition. The opening filter-carrier can also interfere with possible objects or domestic appliances normally adjacent to the machine for the filtered coffee.

Moreover, the upper lid which opens upwards has the same disadvantages already illustrated for the known machines which load the coffee and water from above.

These problems are all the more serious because in modern societies the need has arisen to make living spaces compact and optimize them in most dwellings, particularly in domestic kitchens, providing the use of domestic appliances that are built-in and/or disposed in series on the work surfaces.

However, known machines for filtered coffee, which for use require daily reloading operations and hence access to the compartments for the coffee and the water, do not allow to exploit the available space to the utmost, and can even limit the presence of other domestic appliances.

U.S. Pat. No. 6,357,342 discloses a coffee maker having a frame with a front and arcuate door or shutter, which can rotate from a closure position to an open position in which it allows the access to the inner space of the machine in order to remove the carafe and the coffee filter so as to make possible filling and replacing operations.

However, this document does not allow filling and reloading operations to be effected without requiring additional maneuvering spaces beyond the volumetric shape of the machine.

A purpose of the present invention is to achieve a machine for filtered coffee that substantially does not need, in order to be reloaded, additional maneuvering spaces, at least above and laterally, beyond the volumetric bulk of the machine itself, and which is simple and economic to produce.

The Applicant has devised, tested and embodied the present invention to overcome the shortcomings of the state of the art and to obtain these and other purposes and advantages.

SUMMARY OF THE INVENTION

The present invention is set forth and characterized in the main claim, while the dependent claims describe other characteristics of the invention or variants to the main inventive idea.

In accordance with the above purpose, a machine for filtered coffee comprises an upper body, which houses a tank for the water, a filter-carrier for the powdered coffee and means to deliver the hot water to the coffee, so as to perform the percolation and/or infusion of the coffee.

According to a characteristic feature of the present invention, access inside the upper body, where the filter-carrier and the water tank are housed, is selectively allowed by an opening and closing system having mainly a shutter opening, which slides along sliding guides, substantially parallel to the outer surface of the upper body of the machine.

In this way, opening the shutter, without entailing any increase in bulk with respect to the closed condition of the machine, the user has complete frontal access inside the machine, both to the filter-carrier, in order to remove or fill it, and also for loading water into the tank, and also possibly for other similar operations of reloading or maintenance.

Moreover, the machine according to the present invention comprises a lower body, having a base to support the entire machine, which houses means and an electric circuit to feed and drive said machine for filtered coffee in general, and instant heating means, to heat the water taken from the tank before it is delivered to the coffee.

To this purpose hydraulic pipes are provided, of a known type, able to convey the water, when the machine is activated, from the tank to the heating means, and from the latter to make it rise to the upper body, advantageously by capillarity and pressure difference due to heating, as far as to the delivery means, disposed above the filter-carrier.

The upper and lower body define a front compartment to house a carafe, into which the coffee obtained by percolating the water in the coffee powder is poured. To this purpose, on the bottom of the filter-carrier, a valve of a known type is disposed, which selectively allows the passage of the percolated coffee from the filter to the carafe, making it available to the user.

Therefore, in normal use, the machine for filtered coffee according to the present invention has an overall volumetric bulk which is given substantially by the upper and lower body and, in this case, has a bulk in height which is usually determined by the size and shape of the carafe, by a required safety distance between the heating means and the base and by a distance between the bottom of the tank and the heating means, so as to obtain a desired water pressure at the moment when it is taken for heating.

According to another feature of the present invention, the shutter opening is pivoted to the upper body, so that it is driven to rotate sliding along guides curvilinear with respect to the upper body and slide retractedly inside it. Advantageously, the means to deliver the heated water is solidly connected to the inner surface of the shutter opening, so that, when the shutter is closed, it is disposed substantially above the filter-carrier, to deliver the water, whereas when the shutter is opened, the delivery means moves solidly with it, leaving free frontal access to the filter-carrier and to the water tank.

According to one aspect of the present invention, the heated water is conveyed to the delivery means by a pipe which, advantageously, also constitutes the pivoting pin for the shutter, thus obtaining a considerable saving in the inner volume required for the machine.

According to another advantageous feature of the present invention, the opening system also comprises a pivoting opening, pivoted to the upper body, which opens frontally towards the user, so as to allow easy access to the tank in order to top up the water level.

Advantageously, the pivoting opening is also operatively connected to the shutter opening, so that, when the latter is opened, simultaneously the pivoting opening also opens towards the user, for an advantageous and complete front access and loading of the machine. Advantageously, the pivoting opening, when open, is also able to constitute front conveyor means for the water, able to guide the water into the tank, so that the user, driving the opening system, can feed the water directly and frontally to the tank, without having to perform the operation from above, or having to remove the tank from above.

According to another advantageous feature of the present invention, the pivoting opening is of a shape mating with the shape of the shutter opening, so that, when they are closed during normal use, access inside the machine is prevented.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 1 is a perspective view of a machine for filtered coffee in an open configuration;

FIG. 2 is a lateral vertical section of the machine for filtered coffee in FIG. 1;

FIG. 5 is a front vertical section of the machine for filtered coffee in FIG. 3;

FIG. 6 is a perspective view in section of the machine for filtered coffee in FIG. 3;

FIG. 7 is a cross section view of the machine for filtered coffee in FIG. 3.

DETAILED DESCRIPTION OF A PREFERENTIAL FORM OF EMBODIMENT

Figure 3:
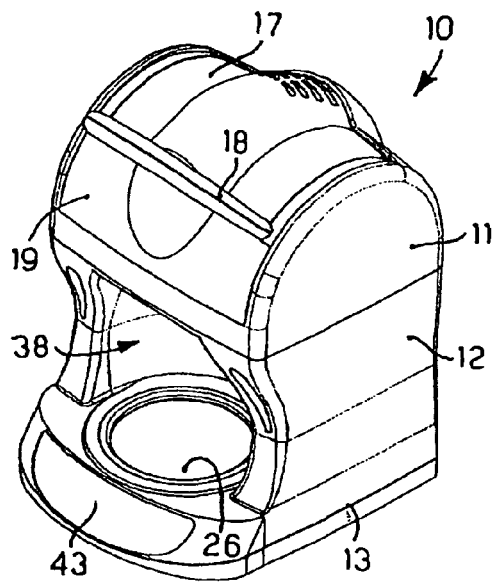
FIG. 3 is a perspective view of the machine for filtered coffee in a closed configuration.
Figure 4:
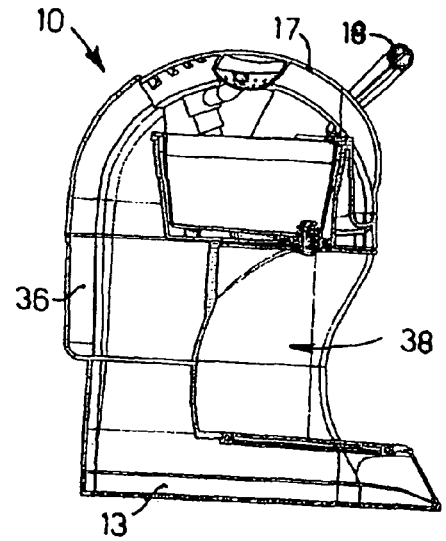
FIG. 4 is a lateral vertical section of the machine for filtered coffee in FIG. 3.
Figure 8:
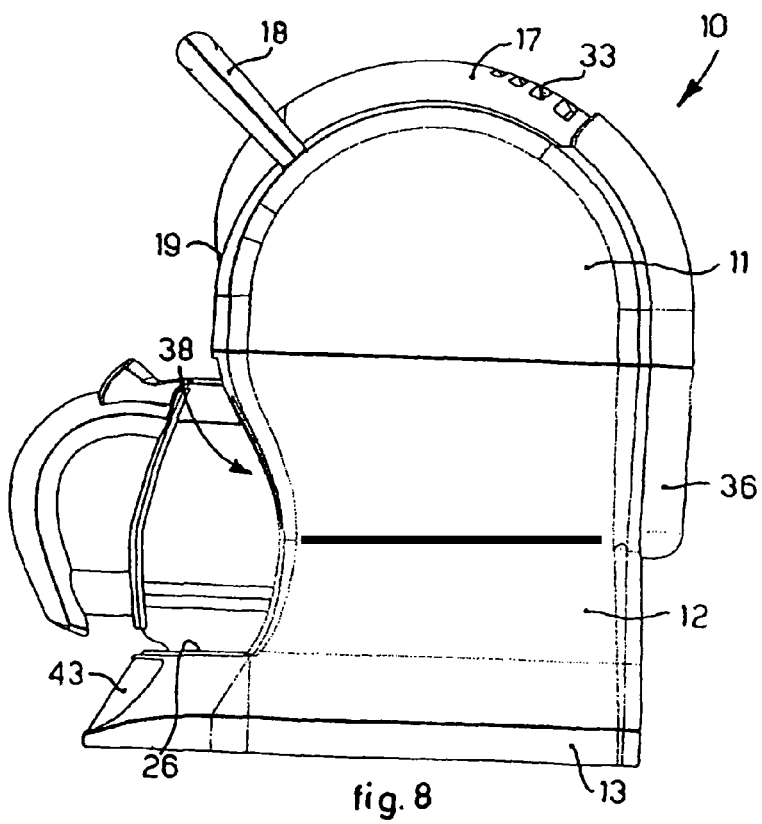
FIG. 8 is a lateral view of the machine in FIG. 1, containing a container for the coffee.

According to the present invention, in FIG. 1 the reference number 10 denotes generally a machine for filtered coffee.

The machine 10 comprises an upper body 11 and a lower body 12, having a base 13 on which the whole machine 10 rests, advantageously made in a single piece, for example by molding a polymeric material, such as polypropylene, polycarbonate, ABS and suchlike.

The upper body 11 and the lower body 12 substantially define the volumetric bulk of the machine 10, in particular the bulk in height H of the machine 10 in normal use (FIG. 2).

The upper body 11 has lateral walls 39, 40 and a bottom wall 41 which delimit, inside the upper body 11, a tank for the water and a housing compartment 37, completely accessible frontally from the outside through a window 42.

The housing compartment 37 is able to accommodate and support inside it a filter-carrier 14, which in turn supports a filter 15 for the coffee, for example of the reusable or throw-away type, made as desired in the known shapes, U-shaped or V-shaped.

The completely frontal access to the tank 20, the housing compartment 37 and the filter-carrier 14, through the window 42, is selectively allowed/prevented by the opening/closing of an opening system 16.

According to the present invention, the opening system 16, when driven, does not determine an increase in the volumetric bulk of the machine 10, at least not above and laterally.

To this purpose, according to the present invention, the opening system 16 comprises at least a shutter 17, able to slide, substantially in a manner parallel to the outer surface of the upper body 11, that is, tangentially thereto (FIG. 1); in this way, remaining always extremely close to the outer surface of the upper body 11, the shutter 17 never goes beyond the bulk in height H, in the passage between the open and closed condition.

According to an advantageous feature of the present invention, the shutter 17 slides along guides 34 made at the upper end of each of the lateral walls 39, 40. Advantageously, the shutter 17 rotates around an axis X, substantially horizontal, which advantageously passes inside the upper body 11; in this case, therefore, the guides 34 are curvilinear, advantageously at least partly circular and centered around the axis X. According to an advantageous feature of the present invention, the guides 34 have bulkheads 35 which extend transversely from the guides 34, substantially in proximity with their outer edge, so as to block the steam produced inside the machine 10 by means of condensation and subsequent precipitation inside the tank 20.

In order to allow an effective rotation, the shutter 17 includes, in the case shown here, a pivoting lever 28, 29 for each of said lateral walls 39, 40. It comes within the scope of the present invention that there may be only one pivoting lever 28 or 29 associated with one of the lateral walls 39, 40. The pivoting levers 28, 29 extend from the inner surface of the shutter 17 towards the inside of the upper body 11. The pivoting levers 28, 29 are hinged to the corresponding lateral wall 39, 40 by means of hinging means 27.

According to an advantageous feature of the present invention, the shutter 17 is equipped with a handle 18 which extends, substantially for its whole length, from its outer surface, to allow a user to maneuver the shutter 17, without risks due to any direct contact with the outer surface of the machine 10, usually at high temperature when in use, especially if covered with metal materials.

According to the present invention, moreover, the upper body 11 includes, substantially on the level of the tank 20, a wider portion 36, able to lower the level of water in the tank 20, but in any case keeping the volume of the latter constant, in accordance with the standard capacities of the field, so that when the shutter 17 is opened and retractedly rotated (FIGS. 1 and 2), it does not come into contact with the water. Advantageously, moreover, the wider portion 36 allows to keep a safety distance or gap between the rear part of the machine 10 and the possible wall it is next to, allowing an effective ventilation and preventing harmful overheating.

Advantageously, the shutter 17 has evaporation grids 33, made as hollows or eyelets through the surface of the shutter 17, to allow a directed passage of the steam to the outside.

According to a characteristic feature of the present invention, the opening system 16 also comprises a pivoting opening 19, which opens completely frontally with respect to a user.

The pivoting opening 19, when open, allows full frontal access to the tank 20, and also possible maintenance work and/or inspections of the filter-carrier 14. Furthermore, the pivoting opening 19 is of a mating shape with the shutter 17, so that when they are closed they prevent access inside the upper body 11, making the outer shape of the machine 10 extremely compact.

Advantageously, the pivoting opening 19 also constitutes a means to convey the water, in order to top up the level of the tank 20. In this way, with a single movement of opening/closing the shutter 17, and hence of the pivoting opening 19, the user selectively has complete frontal access to the filter-carrier compartment 37, the filter-carrier 14 and the tank 20.

The pivoting opening 19 is advantageously connected at least to the left pivoting lever 29, so that, when the shutter 17 is opened/closed, correspondingly, the rotational movement of the left pivoting lever 29 also influences the opening/closing of the pivoting opening 19. To this end, the pivoting opening 19 has a rotation lever 32, connected rotatably to a connection bar 31, in turn connected to the left pivoting lever 29, in order to achieve the automatic opening/closing of the pivoting opening 19, simultaneously with the opening/closing of the shutter 17.

According to a variant of the present invention, the pivoting opening 19 can be maneuvered manually, or is made as a removable drawer.

The lower body 12 includes a heating compartment 24, which houses heating means 25 for the water of the tank, such as electric resistances of a known type, and known electric means and circuits, to electrify the machine 10. The heating means 25 heat the water, which arrives from the tank 20, through hydraulic connections of a known type, which connect the tank 20 to the lower body 12. According to one feature of the present invention, the heating compartment 24 is delimited at the upper part by a heating plate 26, on which a carafe for the coffee is able to rest, in order to keep its temperature, for example in the case of a glass carafe, and generally in the case of non-thermal carafes.

The water is heated in the lower body 12 and rises to the upper body 11 due to capillarity, advantageously due to the effect of the increase in temperature and the consequent variation in pressure, where it is delivered to the coffee contained in the filter 15.

To this end, the machine 10 is equipped with hydraulic connections 21 (FIG. 2) suitable to convey the hot water to delivery means 22, having an outlet, advantageously of the shower type, in order to nebulize the hot water onto the filter 15 and give rise to the percolation of the coffee.

The delivery means 22 is solidly connected with the inner surface of the shutter 17; in this way, by selectively opening and closing the shutter 17, the position of the delivery means 22 is also influenced, passing from a delivery position, substantially above the filter and the filter-carrier when the shutter is closed, to an inactive position, not suitable to deliver the hot water to the filter-carrier 24, for example lateral thereto, when the shutter 17 is open for access inside the upper body 11.

According to one feature of the present invention, the hydraulic connections 21 comprise a hydraulic pipe 30, substantially transverse to the lateral wall 39, which is comprised in the hinging means 27, or also constitutes a hinging means of the shutter 17 to the lateral wall 39 (FIGS. 5, 6 and 7). The coffee is obtained by percolating and filtering the hot water through the filter 15, and is delivered into the appropriate carafe, of a known type, housed in a carafe compartment 38, defined by the upper body 11 and the lower body 12, below the filter-carrier 14. the passage of the coffee percolated by the filter 15 to the carafe is allowed by a delivery valve 23, of a known type, for example an equalizer valve, a mushroom valve or suchlike.

According to an advantageous feature of the present invention, the machine 10 is provided with a command and control unit 43, completely accessible frontally, for example disposed on the base 13, and equipped with regulation means, of a known type, for example analogical or advantageously digital, in order to regulate and/or command the functioning of the machine as desired.

It is clear that modifications and/or additions of parts may be made to the machine for filtered coffee as described heretofore, without departing from the scope of the present invention.

It is also clear that, although the present invention has been described with reference to some specific examples, a person of skill in the art shall certainly be able to achieve many other equivalent forms of machine for filtered coffee, having the characteristics as set forth in the claims and hence all coming within the field of protection defined thereby.

What is claimed is:

1. A machine for filtered coffee, having an upper body, inside which a filter-carrier for the coffee and a tank for the water are housed, both accessible through a window, the machine comprising a shutter able to be moved slidingly with respect to said upper body between an open condition and a closed condition of said window and vice versa, so as to selectively allow complete access to said filter-carrier and to said tank, through said window, leaving free access to the filter-carrier and to the water tank, the machine further comprising a pivoting opening which opens with respect to a user and allows access to said tank, when said shutter is in the open condition, for conveying water to the tank without moving said tank from the machine, wherein said shutter is pivoted to said upper body, so as to be movable rotatably and slidingly around a substantially horizontal axis, said machine further having delivery means connected to said tank by means of hydraulic connections having at least a hydraulic pipe and able to deliver the water to said filter-carrier, wherein said hydraulic pipe constitutes pivoting means able to pivot said shutter.

2. A machine for filtered coffee as in claim 1, wherein said shutter, in the movement thereof between said open position and said closed position, always remains contained within the bulk of said upper body.

3. A machine for filtered coffee as in claim 1, wherein said shutter is able to slide along guides made on said upper body.

4. A machine for filtered coffee as in claim 3, wherein said guides are at least partly curved.

5. A machine for filtered coffee as in claim 3, wherein said guides are at least partly circular and centered around said axis (X).

6. A machine for filtered coffee as in claim 3, wherein said guides are substantially horizontal.

7. A machine for filtered coffee as in claim 1, wherein said pivoting opening is connected to said shutter so that the opening/closing movement of said shutter causes simultaneously and correspondingly a movement of the pivoting opening between an open position, inclined with respect to the upper body, and a closed position, substantially parallel to the upper body.

* * * * *